United States Patent
Campbell et al.

(10) Patent No.: US 10,060,563 B2
(45) Date of Patent: Aug. 28, 2018

(54) TUBE FITTING

(71) Applicant: The Boeing Company, Seal Beach, CA (US)

(72) Inventors: Brent Campbell, Seattle, WA (US); Ronald Clements, Kent, WA (US); Tammy McLeod, Renton, WA (US); Son Nguyen, Renton, WA (US); Alexandra Sonnabend, Seattle, WA (US)

(73) Assignee: The Boeing Company, Chicago, IL (US)

( * ) Notice: Subject to any disclaimer, the term of this patent is extended or adjusted under 35 U.S.C. 154(b) by 766 days.

(21) Appl. No.: 14/154,377

(22) Filed: Jan. 14, 2014

(65) Prior Publication Data

US 2015/0198273 A1    Jul. 16, 2015

(51) Int. Cl.
  *F16L 37/138*   (2006.01)
  *F16L 19/00*    (2006.01)
  *F16L 19/025*   (2006.01)

(52) U.S. Cl.
  CPC ........... *F16L 37/138* (2013.01); *F16L 19/005* (2013.01); *F16L 19/025* (2013.01); *F16L 2201/10* (2013.01)

(58) Field of Classification Search
  CPC ..... F16L 19/025; F16L 19/005; F16L 37/138; F16L 2201/10
  USPC .......................................................... 285/92
  See application file for complete search history.

(56) References Cited

U.S. PATENT DOCUMENTS

| | | | |
|---|---|---|---|
| 1,069,916 A | | 8/1913 | Windsor |
| 4,451,069 A | * | 5/1984 | Melone ............... F16L 37/0842 |
| | | | 285/315 |
| 4,781,400 A | | 11/1988 | Cunningham |
| 4,801,160 A | | 1/1989 | Barrington |
| 5,226,682 A | | 7/1993 | Marrison et al. |
| 5,350,200 A | | 9/1994 | Peterson et al. |
| 5,388,866 A | | 2/1995 | Schlosser |
| 5,553,895 A | | 9/1996 | Karl et al. |
| 5,752,726 A | | 5/1998 | Fixemer |

(Continued)

FOREIGN PATENT DOCUMENTS

| | | |
|---|---|---|
| DE | 19516096 | 11/1996 |
| EP | 0728977 | 8/1996 |

(Continued)

OTHER PUBLICATIONS

European Search Report, European Application No. 14198169, dated May 12, 2015.

(Continued)

*Primary Examiner* — Greg Binda
*Assistant Examiner* — Zachary T Dragicevich
(74) *Attorney, Agent, or Firm* — Perman & Green, LLP

(57) ABSTRACT

A tube fitting including a first coupling member having at least a snap coupling, and a second coupling member having a first quick-connect side having a mating snap coupling disposed at a first end of the second coupling member, and a second quick-connect side configured for threaded engagement disposed at a second end of the second coupling member, the second end being opposite the first end, wherein the mating snap coupling is configured to engage the snap coupling to effect coupling of the first and second coupling member.

20 Claims, 8 Drawing Sheets

(56) References Cited

U.S. PATENT DOCUMENTS

| | | | | |
|---|---|---|---|---|
| 5,823,702 | A | * | 10/1998 | Bynum ................ F16L 19/005 |
| | | | | 285/82 |
| 5,890,746 | A | * | 4/1999 | Mueller ................ F16L 19/02 |
| | | | | 285/92 X |
| 6,155,607 | A | * | 12/2000 | Hewitt ............... F16L 37/0985 |
| | | | | 285/322 |
| 6,302,447 | B1 | * | 10/2001 | Lee ...................... F16L 19/005 |
| | | | | 285/315 |
| 6,494,494 | B2 | | 12/2002 | Vogel et al. |
| 6,517,119 | B2 | | 2/2003 | Thomas |
| 6,916,988 | B1 | | 7/2005 | Auray et al. |
| 7,000,953 | B2 | | 2/2006 | Berghaus |
| 7,681,925 | B2 | | 5/2010 | Lambert et al. |
| 7,914,050 | B2 | | 3/2011 | Udhofer et al. |
| 8,641,099 | B2 | * | 2/2014 | Cuva ..................... F16L 19/005 |
| | | | | 285/92 X |
| 8,777,931 | B2 | * | 7/2014 | Davis ................... A61M 39/10 |
| | | | | 285/332 |
| 2004/0056481 | A1 | | 3/2004 | Do et al. |
| 2004/0108721 | A1 | * | 6/2004 | Olson .................. F16L 19/0218 |
| 2007/0052234 | A1 | * | 3/2007 | Breay .................... F16L 25/01 |
| | | | | 285/354 |
| 2007/0164566 | A1 | | 7/2007 | Patel |
| 2014/0008908 | A1 | | 1/2014 | Cuva et al. |

FOREIGN PATENT DOCUMENTS

| | | |
|---|---|---|
| EP | 1703191 | 9/2006 |
| EP | 2224155 | 9/2010 |
| WO | 0077434 | 12/2000 |
| WO | 2013162150 | 10/2013 |

OTHER PUBLICATIONS

Eaton Aerospace Group. "Aeroquip Sure-Mate Couplings", Mar. 2013.

The Parker Fluid Connectors Group. "Parker Universal Push-to-Connect". Parker Hannifin Corporation, Aug. 2012 Bulletin 4017-1(UK).

The Oetiker Group. "Quick Connectors". www.oetiker.com, Jun. 2012.

Shur-Lok Company. "Fluid Fittings: Flareless Tube End". 2012.

Eaton Hydraulics. "Eaton STC Connectors Catalog", May 2013.

Parker Hannifin Corporation, Tube Fitting Division. "Universal Push-to-Connect Assembly". Columbus, OH, (Feb. 2008).

McCorkle, D. "Fluid Coupling". Shur-Lok CorporationTechnical Sales Bulletin, TSB0003. (Sep. 25, 1998).

* cited by examiner ns and, more particularly, to quick connect tubing connections.

TUBE FITTING

BACKGROUND

1. Field

The exemplary embodiments generally relate to tubing connections and, more particularly, to quick connect tubing connections.

2. Brief Description of Related Developments

Generally tubing connections, couplings or fittings include a male and a female connection member that are fastened together. In one example, the male and female connection member may be fastened together by threading the male connection member onto the female member to a predetermined torque using tools such as, for example, wrenches. In other examples, the tubing connection may be a quick-connect coupling where the male and female connection members may be pressed together (e.g. with or without tools) so that locking features of the male connection member engage corresponding locking features of the female connection member.

When assembling the male and female connection members mechanics may apply an improper torque (e.g. over or under torqued) to the tubing connection which may hinder the effectiveness of the connection. In addition there may be ergonomic effects of assembling the tubing connections due to, for example, high torque values for metal on metal seals. The threaded and quick connect tubing connections may not allow installation in hard-to-reach or limited space applications and may not provide an indication of when a proper connection is made leading to prolonged assembly times for coupling two pieces of tubing.

It would be advantageous to provide a quick connect tubing connection that addresses one or more of the aspects described above.

SUMMARY

A tube fitting including a first coupling member having at least a snap coupling, and a second coupling member having a first quick-connect side having a mating snap coupling disposed at a first end of the second coupling member, and a second quick-connect side configured for threaded engagement disposed at a second end of the second coupling member, the second end being opposite the first end, wherein the mating snap coupling is configured to engage the snap coupling to effect coupling of the first and second coupling member.

A tube fitting including a first fitting member having a body including a shoulder portion, a second fitting member having a body including a gripping portion and a plurality of tines extending from the body, the plurality of tines being configured to engage the shoulder, a third fitting member disposed between the first fitting member and second fitting member, and at least one elastomeric seal disposed between the first fitting member and the third fitting member.

A method for connecting tubing where the method includes aligning a first side tube fitting member with a second side tube fitting member, positioning at least one elastomeric seal member between the first and second side fitting members, moving the first side tube fitting member and the second side tube fitting member together to at least partially compress the at least one elastomeric seal member, and engaging a third fitting member with the first side fitting member such that a seal formed by the at least one elastomeric seal member between the first side fitting member and the second side fitting is maintained through engagement between an angled surface of a tine portion of the third fitting member and an angled surface of a shoulder portion of the first side tube fitting.

BRIEF DESCRIPTION OF THE DRAWINGS

The foregoing aspects and other features of the disclosed embodiment are explained in the following description, taken in connection with the accompanying drawings, wherein.

DETAILED DESCRIPTION

Figure 9:
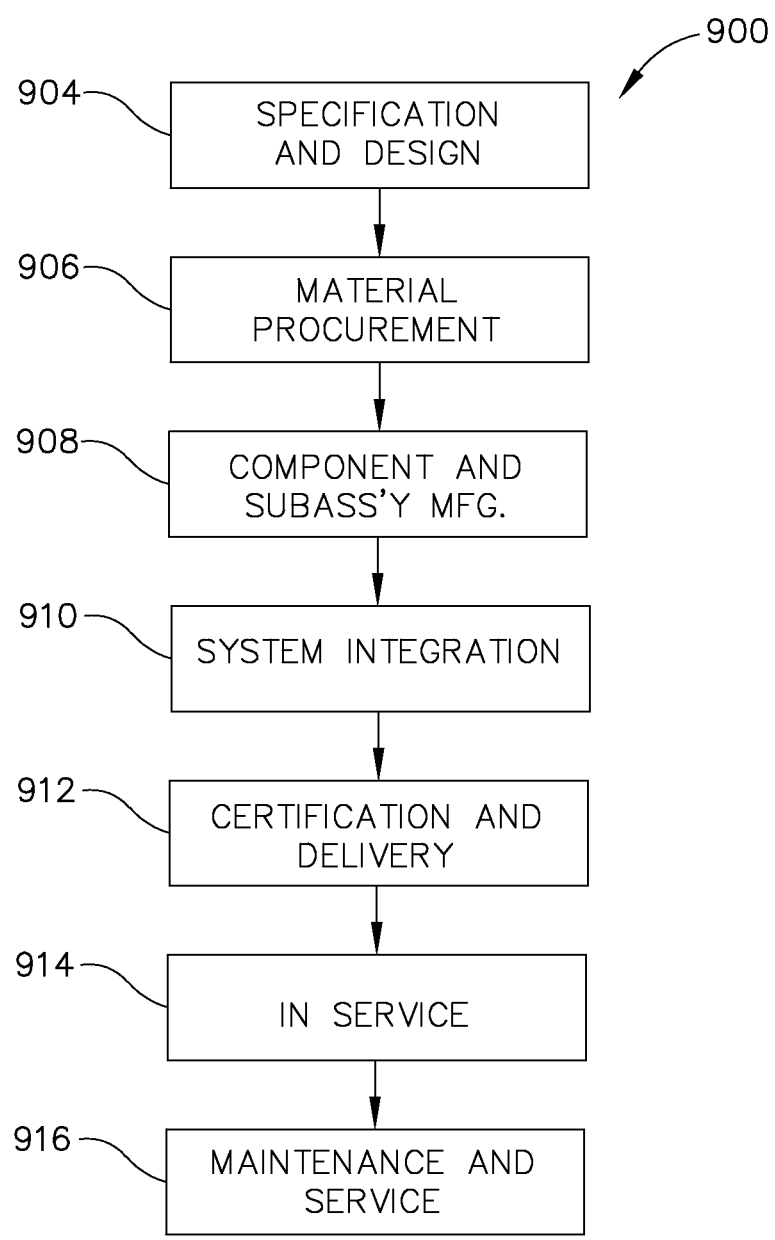
FIG. 9 is a flow diagram of aircraft production and service methodology in accordance with aspects of the disclosed embodiment.
Figure 10:
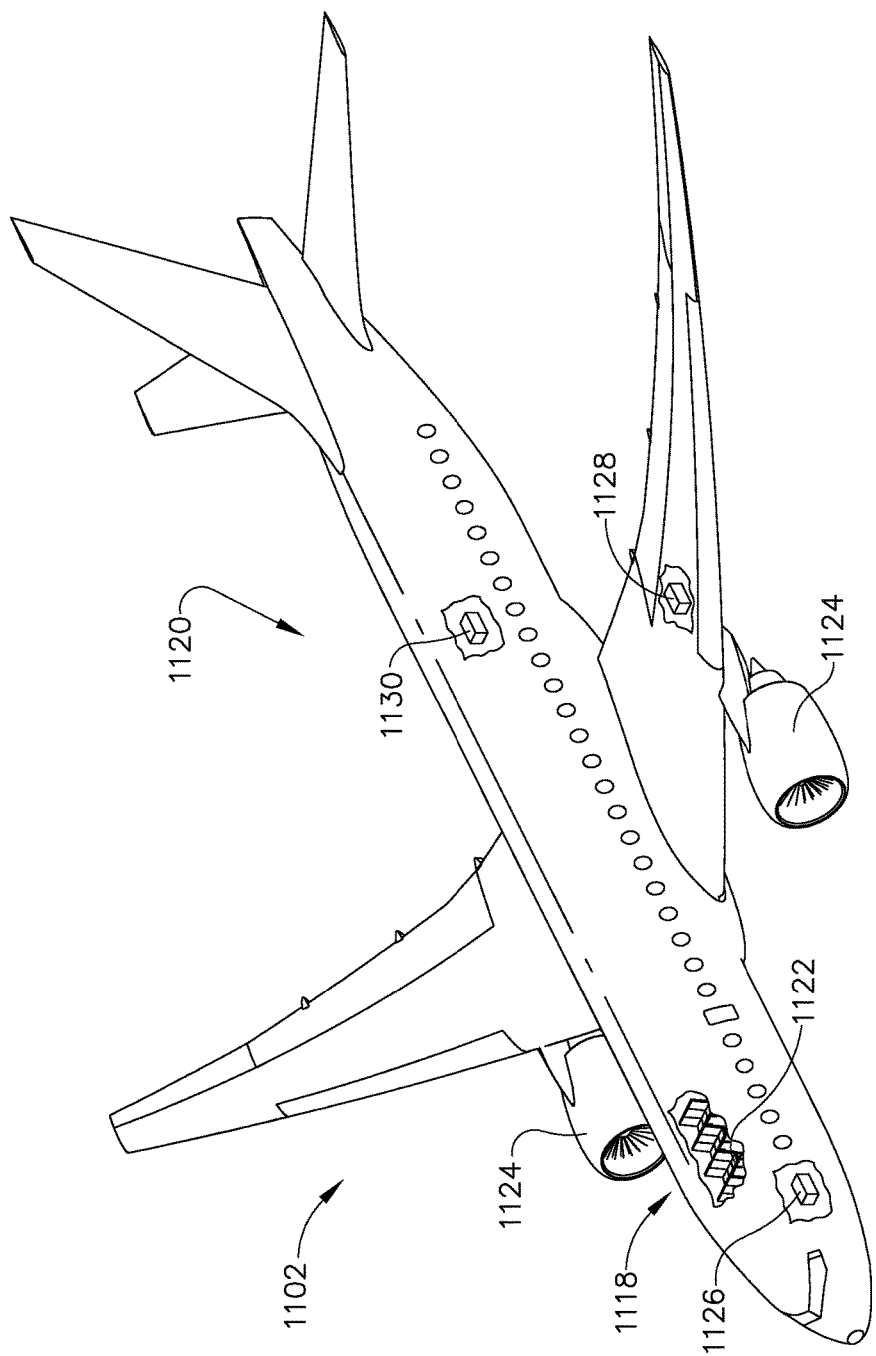
FIG. 10 is a schematic illustration of an aircraft incorporating features of the disclosed embodiment.

Examples of the disclosure may be described in the context of an aircraft manufacturing and service method 900 as shown in FIG. 9 and an aircraft 1102 as shown in FIG. 10. During pre-production, the illustrative method 900 may include specification and design 904 of the aircraft 1102 and material procurement 906. During production, component and subassembly manufacturing 908 and system integration 910 of the aircraft 1102 take place. Thereafter, the aircraft 1102 may go through certification and delivery 912 to be placed in service 914. While in service by a customer, the aircraft 1102 is scheduled for routine maintenance and service 916 (which may also include modification, reconfiguration, refurbishment, and so on).

Each of the processes of the illustrative method 900 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 10, the aircraft 1102 produced by the illustrative method 900 may include an airframe 1118 with a plurality of high-level systems 1120 and an interior 1122. Examples of high-level systems 1120 include one or more of a propulsion system 1124, an electrical system 1126, a hydraulic system 1128, and an environmental system 1130.

Any number of other systems may be included. Although an aerospace example is shown, the principles of the disclosure may be applied to other industries, such as the automotive and ship-building industries, among others.

Apparatus and methods shown or described herein may be employed during any one or more of the stages of the manufacturing and service method 900. For example, components or subassemblies corresponding to component and subassembly manufacturing 908 may be fabricated or manufactured in a manner similar to components or subassemblies produced while the aircraft 1102 is in service. Also, one or more aspects of the apparatus, method, or a combination thereof may be utilized during the production stages 908 and 910, for example, by substantially expediting assembly of or reducing the cost of the aircraft 1102. Similarly, one or more aspects of the apparatus or method realizations, or a combination thereof may be utilized, for example and without limitation, while the aircraft 1102 is in service, e.g., maintenance and service 916.

Figure 1:
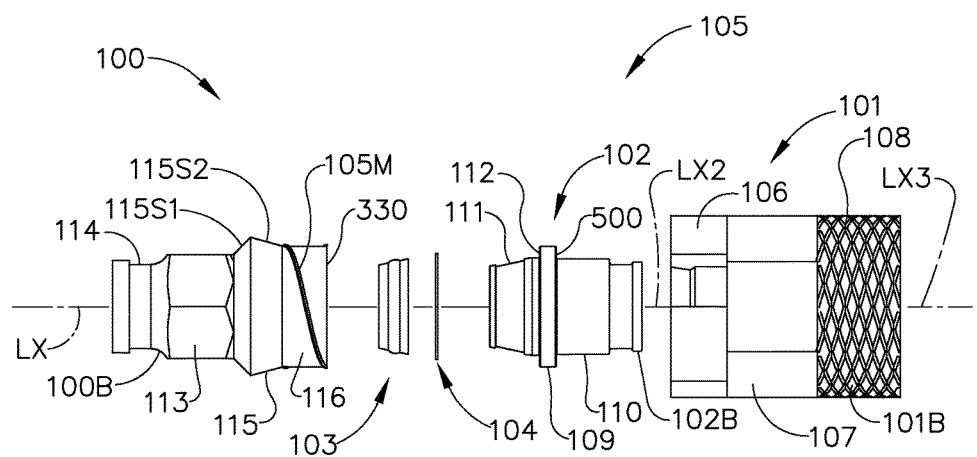
FIG. 1 is a schematic illustration of a tube fitting in accordance with aspects of the disclose embodiment.
Figure 2:
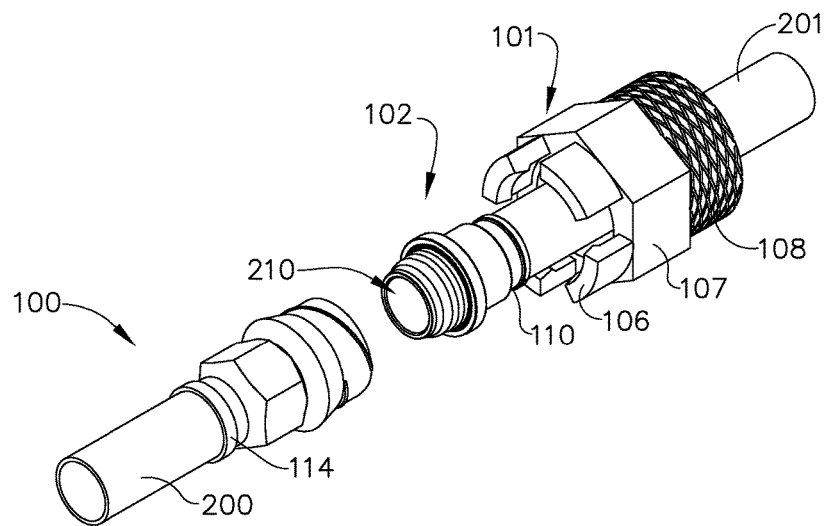
FIG. 2 is a schematic illustration of the tube fitting of FIG. 1 in accordance with aspects of the disclosed embodiment.

FIG. 1 is a schematic illustration of a tube fitting 105 in accordance with aspects of the disclose embodiment. Although the aspects of the disclosed embodiment will be described with reference to the drawings, it should be understood that the aspects of the disclosed embodiment can be embodied in many forms. In addition, any suitable size, shape or type of elements or materials could be used.

In one aspect the tube fitting 105 may be a quick-connect or easy-snap fitting. The tube fitting 105 may not need tools to install or otherwise connect the tube fitting members 100, 101, 102 (e.g. provides a tool-less installation as will be described below) where standard tools are used to disconnect or otherwise uninstall the tube fitting members. The tube fitting 105 may allow for reduced installation times, such as when compared to threaded compression fittings or other conventional fittings, while providing a re-connectable fitting that can be installed in, for example, any suitable aircraft 1102 (FIG. 10) or other vehicle that includes tube connectors for hydraulic, pneumatic or other suitable fluidic systems. In one aspect the tube fitting 105 may be provided for installation on existing tubing where one or more of the tube fitting members 100, 101, 102 may be coupled to or otherwise installed on any existing tubing in any suitable manner, such as by crimping, swaging, soldering, welding, etc. In other aspects the tube fitting 105 may be preinstalled on tubing where the tubing/fitting assembly is installed as a unit within, for example, the aircraft 900. As will also be described in greater detail below the tube fitting may include one or more elastomeric seals and have a configuration that provides for positive low force seals.

Referring also to FIGS. 2-6 in one aspect the tube fitting 105 includes a first side fitting member or union 100, a second side fitting member or sleeve 102 and a coupling member or nut 101. The union 100, sleeve 102 and nut 101 may be constructed of any suitable metal, plastic, composite or any other suitable material.

Figure 6:
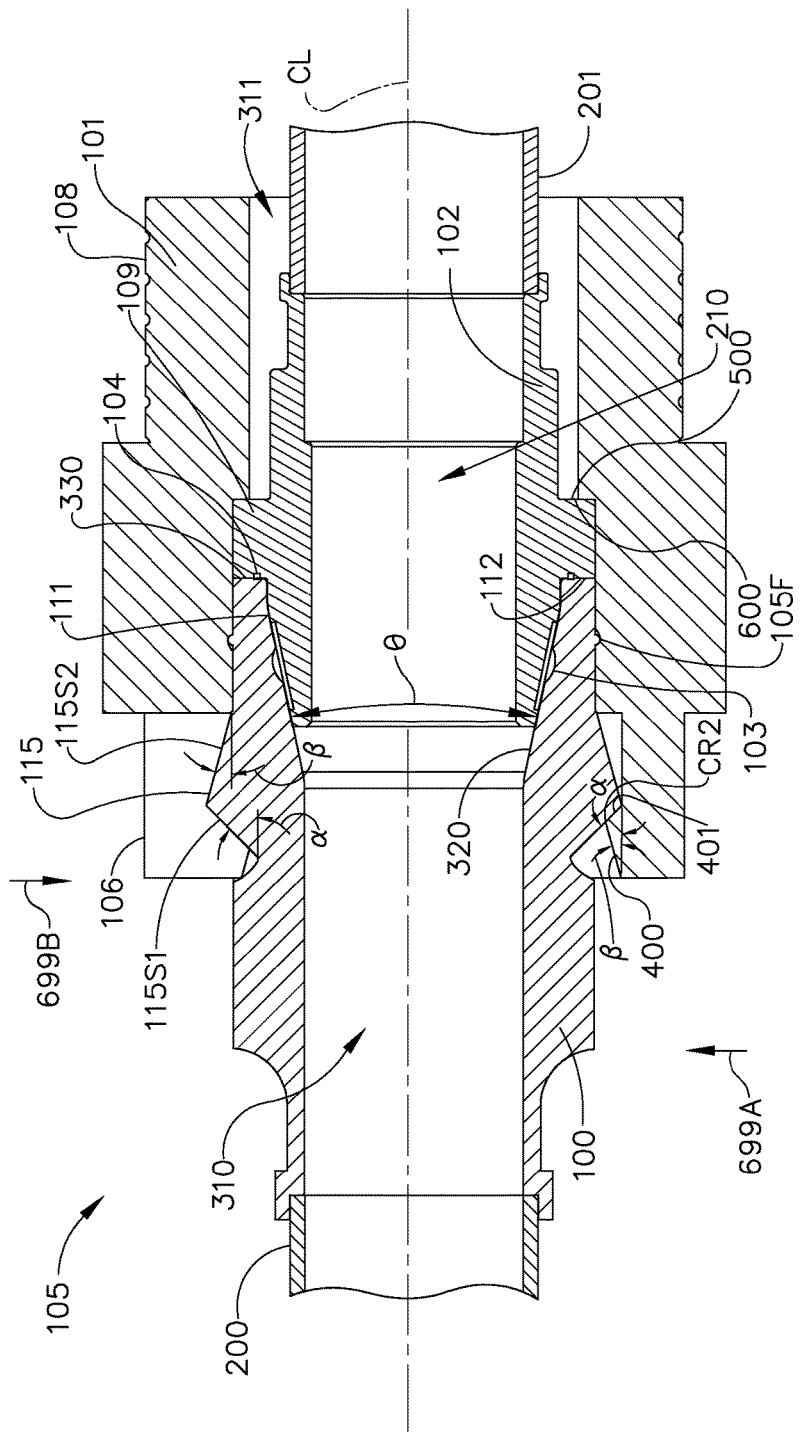
FIG. 6 is a schematic sectional view of the tube fitting of FIG. 1 in accordance with aspects of the disclosed embodiment.

The union 100 includes a generally cylindrical body 100B having an internal passage 310 extending along a longitudinal axis or centerline LX of the body 100B. The union 100 may also include a tubing engagement portion 114, one or more flats 113, a shoulder portion 115 and a seal portion 116 axially arranged or spaced along the body. The internal passage 310 may extend through the body 100B for allowing fluid to pass through the union 100. The tubing engagement portion 114 may be disposed at a first end of the union 100 and be configured for coupling the union 100 to any suitable tubing 200. In one aspect the tubing engagement portion may be configured such that the tubing 200 is inserted into the internal passage 310 and the tubing engagement portion is secured to the tubing in any suitable manner substantially similar to that described above. In other aspects the tubing 200 may be secured to the union 100 in any suitable manner. The one or more flats 113 may be any suitable flats or surfaces configured to allow any suitable tool, such as a wrench, to engage the union for connecting or disconnecting the tube fitting members 100, 101, 102 as will be described below. The shoulder portion 115 may include a first angled surface or disengagement ramp 115S1 and an opposing second angled surface or engagement ramp 115S2. As can be seen in FIG. 6, an angle β of the engagement ramp 115S2 (e.g. relative to the longitudinal axes or centerline LX) may be shallower or less than an angle α of the disengagement ramp 115S1 (e.g. relative to the longitudinal axes or centerline LX). The seal portion 116 may be disposed at a second end of the union 100 and include one or more fastening members or features 105M configured to provide mechanical assistance when coupling the tube fitting members 100, 101, 102 together. In one aspect the fastening members 105M may include one or more threads having any suitable pitch. For example, the threads may be quarter-turn or half-turn threads that allow for coupling of the tube fitting member 100, 101, 102 with a quarter or half turn of, for example, the nut 101 relative to the union 100. In other aspects the threads may have any suitable pitch for coupling the tube fitting members with any suitable relative rotation amount between, for example, the union 100 and the nut 101. In still other aspects fastening members 105M may not be provided. As can be seen best in FIG. 3, the seal portion 116 may include a first seal surface 320 formed in a wall of the internal passage 310. The first seal surface 320 may be a conical surface having any suitable angle θ. In one aspect the first seal surface 320 may form a conical surface having an angle θ of about 24° while in other aspects the angle θ may be more or less than about 24°. The seal portion 116 may also include a second seal surface 330 at an end face of the seal portion 116. In other aspects the first seal surface 320 may have any suitable shape and or configuration such as an acorn shaped surface or parabolic surface having any suitable angled surface(s).

Figure 5:
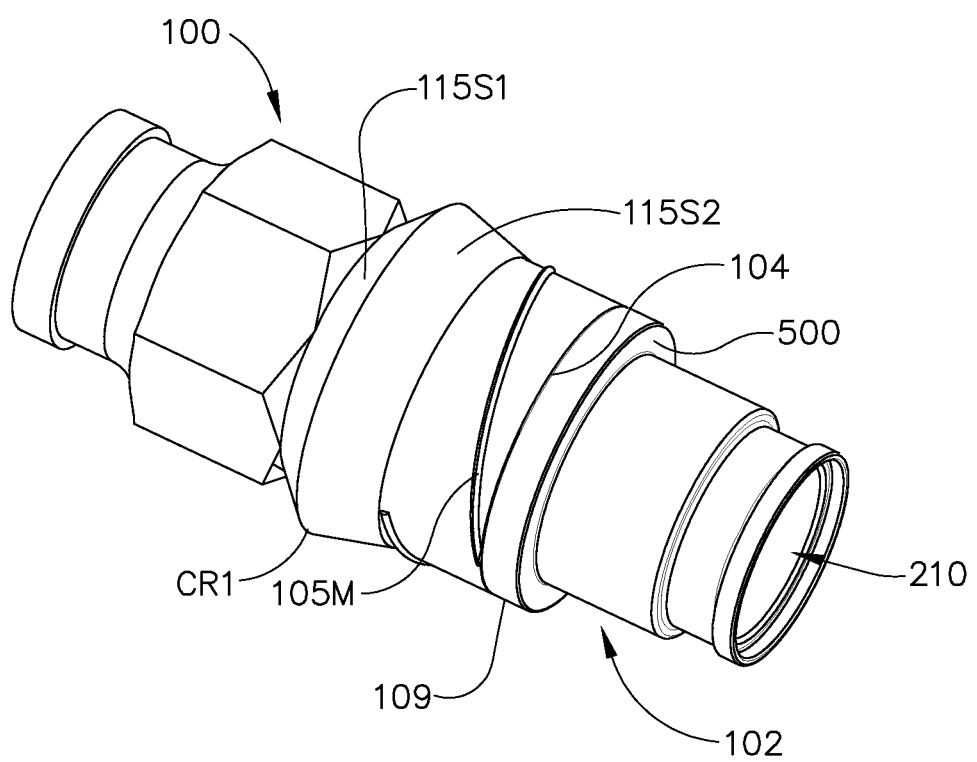
FIG. 5 is a schematic illustration of a portion of the tube fitting of FIG. 1 in accordance with aspects of the disclosed embodiment.

In one aspect the sleeve 102 includes a generally cylindrical body 102B having an internal passage 210 extending along a longitudinal axis or centerline LX2 of the body 102B. The sleeve 102 may also include a tubing engagement portion 110, a flange 109 and a seal portion 111 axially arranged or spaced along the body 102B. The internal passage 210 may extend through the body 102B for allowing fluid to pass through the sleeve 120. The tubing engagement portion 110 may be located at a first end of the sleeve 102 and may be substantially similar to tubing engagement portion 114 of the union 100 for securing the sleeve 102 to any suitable tubing 201 in any suitable manner such as described above. The flange 109 may extend radially from a peripheral surface of the tubing engagement portion 110 and include an engagement surface 500 and a flange sealing surface 112. The seal portion 111 may be disposed at a second end of the sleeve 102 and form a conical sealing surface where the conical angle of the seal portion 111 corresponds to the conical angle θ of the first seal surface 320 of the union 100 for allowing sealing engagement between the union 100 and sleeve 102. In one aspect the angle θ may allow for positive low force seals when the longitudinal axes LX, LX2 of the union 100 and sleeve 101 are substantially aligned or misaligned by up to about 2°. In other aspects the angle θ may allow for low force seals when the longitudinal axes LX, LX1 are misaligned by an angle greater than about 2°. In other aspects the seal portion 111 may have any suitable shape and or configuration such as an acorn shaped surface or parabolic surface. In still other aspects the angle of the first seal surface 320 and the angle of the seal portion 111 may be different. As can be seen in FIG. 1, a first elastomeric member 103, such as a conical seal member or a seal member having any suitable shape and/or configuration, may be placed over or otherwise affixed to the surface of seal portion 111 such that when seal portion 111 is inserted into the union 100 the first elastomeric member 103 engages both seal surface 320 and the surface of seal portion 111 to form a first fitting seal. A second elastomeric member 104 may be placed against seal surface 112 of the flange 109 or at least partly within the flange (e.g. such as in a recessed groove or slot) such that when the union 100 and sleeve 102 are engaged or otherwise fitted together (as best seen in FIG. 5), the second elastomeric member 104 forms a seal between the seal surface 112 of the flange 109 and the seal surface 330 of the union 100 to form a second fitting seal. In one aspect the first fitting seal (e.g. formed by elastomeric member 103) may be configured to substantially prevent fluids from escaping (e.g. hold a system pressure or partial system pressure of the fluidic system in which the tube fitting is installed) the assembled or otherwise coupled tube fitting 105. The second fitting seal (e.g. formed by elastomeric member 104) may be configured to substantially prevent ingress of particles and/or fluids into the internal passage(s) of the assembled tube fitting 105. In other aspects the second fitting seal may also be configured to substantially prevent fluids from escaping (e.g. hold a system pressure or partial system pressure of the fluidic system in which the tube fitting is installed) the assembled or otherwise coupled tube fitting 105 in event fluid passes by the first fitting seal.

The nut 101 includes a generally cylindrical body 101B having an internal passage 311 extending along a longitudinal axis or centerline LX3 of the body 101B. In this aspect the internal passage 311 is sized and configured to allow tubing 201 to be inserted into the internal passage 311 while allowing the nut 101 to slide along tubing 201 (e.g. the internal passage has an inner diameter greater than an outer diameter of the tubing). The internal passage 311 may also be configured to allow the sleeve 102 to be at least partially inserted into the internal passage 311, or in other words to allow the nut 101 to slide over at least a portion of the sleeve 102 so that the sleeve 102 is located at least partially within the internal passage 311. As can be seen best in FIG. 6, the internal passage 311 includes a step or shoulder 600 configured to engage the engagement surface 500 of the sleeve 102 when the sleeve 102 is located at least partially within the internal cavity 311. Engagement between the shoulder 600 and the engagement surface 500 of the sleeve may provide compressive force to one or more of the elastomeric seal members 103, 104 when the tube fitting 105 is assembled or when the tube fitting 105 is being assembled. As may be realized, when assembling the sleeve 102 and nut 101 onto tubing 201 the tubing 201 may be inserted through the internal passage 311 of the nut 101 and the sleeve 102 may be affixed to the tubing 201 to prevent removal of the nut 101 from the tubing and so that the flange 109 is disposed between the shoulder 600 of the nut 101 and the seal surface 330 of the union 100 when the tube fitting 105 is assembled.

The nut 101 may also include a textured surface 108 and one or more flats 107 axially arranged or spaced along the longitudinal axis of the body 101B. The textured surface 108 may be located at a first end of the body 101B and include any suitable texture for allowing tool-less manual manipulation of the nut 101 (e.g. manipulation substantially without tools). For example, the textured surface 108 may be a knurled surface that provides a predetermined amount of grip so that an operator (e.g. mechanic) can grasp the nut 101 and engage the nut 101 with the union 100 as will be described below. The one or more flats 107 may be substantially similar to the one or more flats 113 of the union so that any suitable tool, such as a wrench, can engage the one or more flats 107 for providing relative rotation between, for example, the nut 101 and the union 100. In one aspect the nut 101 includes a plurality of tines 106 extending from the body 101B on an opposite side of the one or more flats 107 than the textured surface 108. Each tine 106 may be integrally formed as a unitary one piece member with the body 101B and extend away from the body 101B so as to be cantilevered from the body 101B. Here the tine may be considered as having a proximate end (e.g. closest to the body) and a distal end (e.g. furthest from the body). Each tine 106 may include an inwardly facing (e.g. generally facing towards the centerline line of the body 101B) shoulder adjacent the distal end having a first angled surface or engagement ramp 400 and an opposing second angled surface or disengagement ramp 401 that may be substantially similar to disengagement ramp 115S1 and engagement ramp 115S2 described above. For example, the engagement ramp 400 may have an angle (e.g. relative to the longitudinal axes or centerline LX3) that is substantially similar to angle β and the disengagement ramp 401 may have an angle (e.g. relative to the longitudinal axes or centerline LX3) substantially similar to angle α. In one aspect the engagement ramps 400, 115S2 may have the same or different angles. In still other aspects the disengagement ramps 401, 115S1 may have the same or different angles. As will be described below, the engagement ramp 400 may be configured to engage the engagement ramp 115S2 for allowing assembly of the tube fitting 105 and disengagement ramp 401 may be configured to engage the disengagement ramp 115S1 to provide a retention force (e.g. against axial loads applied to the assembled tube fitting 105) that allows the assembled tube fitting 105 to withstand fluidic system pressures, burst and blow off loads and while providing the ability to disassemble the tube fitting 105 upon application of a predetermined torque to the nut 101 relative to the union 100 or vice versa. In another aspect at least a portion of the internal passage 311 of the nut 101 may include fastening members or features 105F (FIG. 6) configured to engage the fastening members 105M of the union 100. Engagement of the fastening members 105F, 105M may provide one or more of a mechanical advantage for assembling the tube fitting 105 and a retention force or resistance to axially loads applied to the assembled tube fitting 105.

Figure 3:
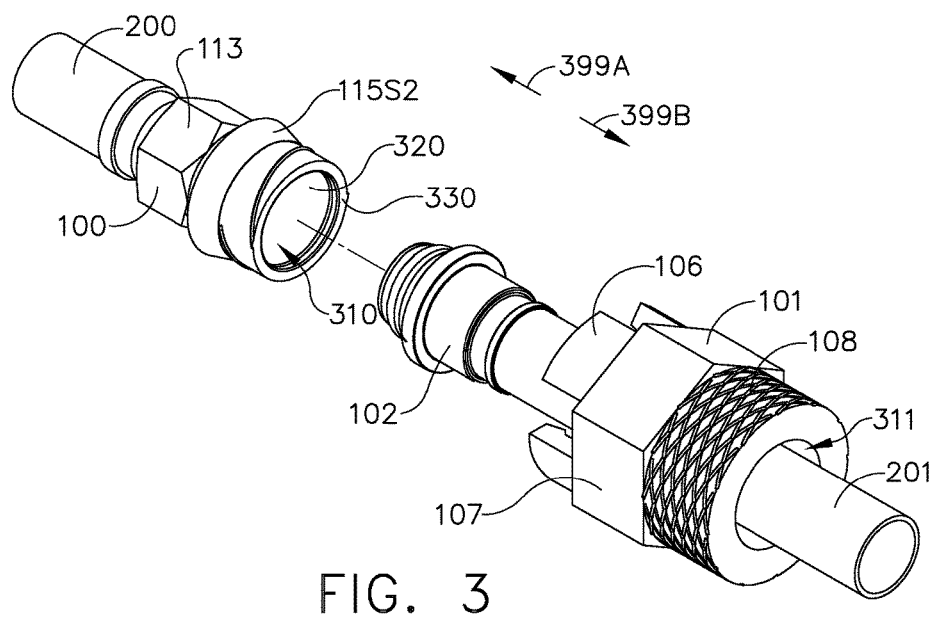
FIG. 3 is a schematic illustration of the tube fitting of FIG. 1 in accordance with aspects of the disclosed embodiment.
Figure 4:
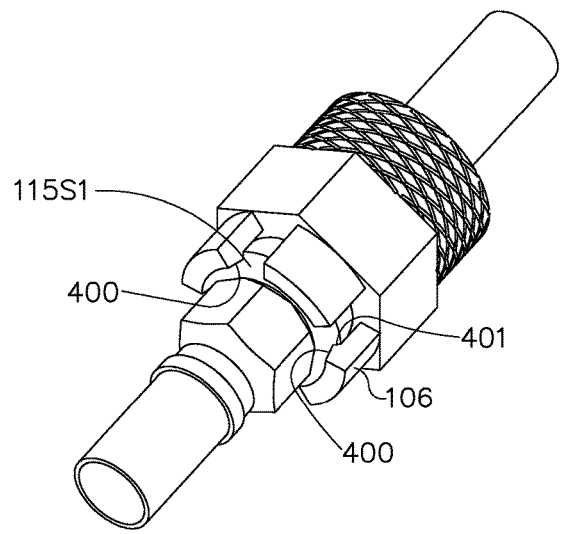
FIG. 4 is a schematic illustration of the tube fitting of FIG. 1 in accordance with aspects of the disclosed embodiment.
Figure 8:
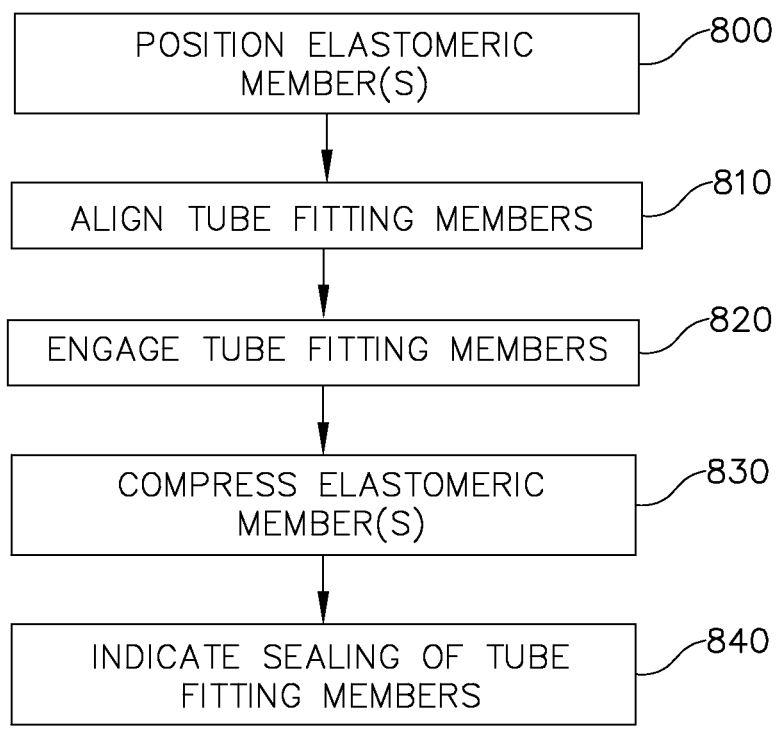
FIG. 8 is a flow diagram in accordance with aspects of the disclosed embodiment.

Referring now to FIGS. 3 and 6 an exemplary assembly of the tube fitting 105 will be described in accordance with an aspect of the disclosed embodiment. In one aspect the union 100 may be affixed to a first side tubing piece 200, the nut 101 may be placed over a second side tubing piece 201 and the sleeve 102 may be affixed to the second side tubing piece 201. Elastomeric member 104 may be positioned adjacent or within a groove of the flange sealing surface 112 and elastomeric member 103 may be positioned on a surface of the seal portion 111 of the sleeve 102 (FIG. 8, Block 800). The longitudinal axis or centerline LX2 (FIG. 1) of the sleeve 102 may be generally aligned with the longitudinal axis or centerline LX (FIG. 1) of the union 100. The longitudinal axis LX3 of the nut 101 may also be substantially aligned with the longitudinal axes LX, LX2 (FIG. 8, Block 810). As may be realized, when the tube fitting members 100, 101, 102 are assembled their axes LX, LX2, LX3 are substantially in-line with a centerline CL of the tube fitting.

The tube fitting members may be engaged for assembly in any suitable manner (FIG. 8, Block 820). For example, the nut 101 may be positioned (e.g. using the textured surface 108 or any other portion of the nut) at least partially over the sleeve 102 so that the sleeve is located at least partially within the internal passage 311 of the nut 101. The nut 101 may be moved in an installation direction 399A towards the union 100 so that the shoulder 600 of the nut presses against the engagement surface 500 of the sleeve 102 causing the seal portion 111 of the sleeve to move towards the surface 320 of the union 100 effecting at least a partial compression of the elastomeric member 103. Moving the nut 101 in the installation direction 399A also causes the flange sealing surface 112 of the sleeve 102 to move towards the seal surface 330 of the union 100 effecting at least a partial compression of the elastomeric member 104. The nut 101 may be moved in the installation direction 399A towards the union 100 so that the tines 106 engage the shoulder 115 and to further compress the elastomeric members 103, 104 (FIG. 8, Block 830). In one aspect the nut 101 may be rotated substantially without tools by, for example, applying force to one or more of the textured surface 108 or the one or more flats 107 so that fastening members 105F of the nut 101 engage fastening members 105M of the union 100 and a mechanical advantage (e.g. such as obtained by the threaded engagement of the fastening members 105M, 105F) is leveraged for moving the nut 101 in the assembly direction 399A. In other aspects, the fastening members 105M, 105F may not be provided and the nut 101 may be pressed in the assembly direction 399A for further compressing the elastomeric members and so that the tines 106 engage the shoulder 115.

As described above, each of the tines 106 includes an engagement ramp or surface 400 that engages and slides over the engagement ramp 115S2 of the shoulder 115. As may be realized, the cantilevered tines 106 may form resilient members that provide a respective radially inward force (e.g. in the direction of arrows 699A, 699B) that resists movement (e.g. in the axial or installation direction) between the nut 101 and the union 100 when the nut is moved in the installation direction 399A. As may be also be realized the tines 106 may flex radially outward, e.g. to provide the resistive force, as the engagement ramp 400 of the tine 106 slides over the engagement ramp 115S2 of the shoulder 115. The angle β of the engagement ramps 400, 115S2 may be provided so that the resistive force provided by the tines 106 is overcome by a predetermined amount of torsional and/or axial engagement force applied (e.g. substantially without tools) to the nut 101 relative to the union 100.

The interaction between the tines 106 and the shoulder may also provide a positive latching system that determines or otherwise provides an indication of when a proper seal is made such as by the compression of the elastomeric members 103, 104 through the interaction of the union 100, the nut 101 and the sleeve 102 (FIG. 8, Block 840). For example, the engagement of the tines 106 with the shoulder 115 may provide one or more of a tactile, aural and visual indication of when the tube fitting is fully assembled and the proper seal is made. In one aspect as the engagement ramp 400 slides along the engagement ramp 115S2, the crest CR2 between the engagement ramp 400 and the disengagement ramp 401 may pass over the crest the CR1 of the shoulder 115 producing an aural sound (e.g. such as a snap) indicating that the nut 101 has been moved a predetermined amount in the installation direction 399A relative to the union 100 to effect sealing of the tube fitting 105. In another aspect the passing of the crest CR2 over the crest CR1 may provide a mechanical vibration in the fitting that can be felt by, for example, a mechanic touching or otherwise holding the fitting members 100, 101, 102. In still another aspect, the tines 106 and shoulder 115 may provide a visual indication of when the nut 101 has been moved a predetermined amount in the installation direction 399A relative to the union 100 to effect sealing of the tube fitting 105. For example, the visual indication may be provided when the disengagement ramp 401 of the tines 106 is visually substantially seated against the disengagement ramp 115S1 of the shoulder 115.

Figure 7:
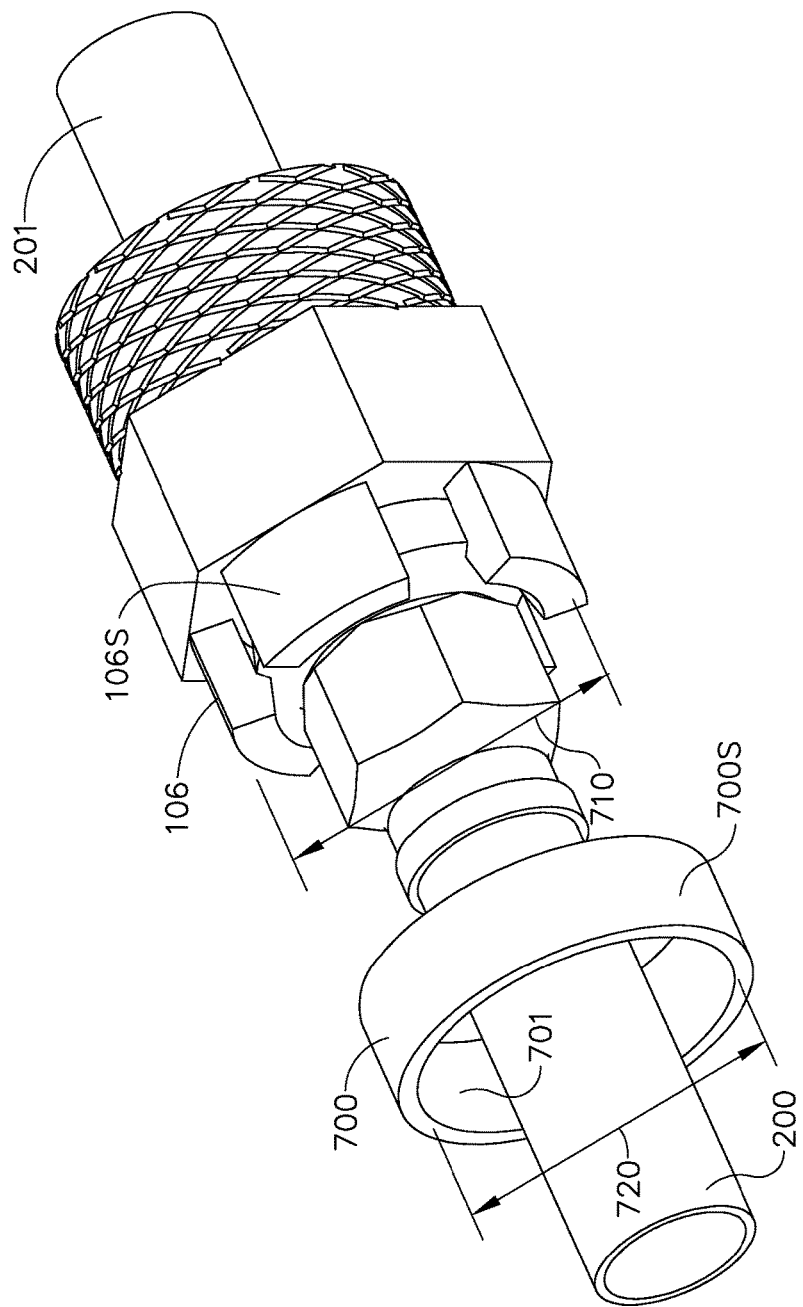
FIG. 7 is a schematic illustration of the tube fitting of FIG. 1 in accordance with aspects of the disclosed embodiment.

In one aspect, referring to FIG. 7 a retainer ring 700 may also be provided. The retainer ring 700 may include an outer surface 700S and an inner surface 701. In this aspect, the retainer ring 700 may include an inner diameter 720 and the tines 106 may include outer surfaces 106S having a diameter 710. The inner diameter 720 of the retainer ring 700 may be larger than the diameter 710 so that the retainer ring fits over the tines. In one aspect any suitable fastener(s) may be provided for holding the retainer ring 700 on the tines 106. For example, there may be a friction fit between the inner surface 701 of the retainer ring 700 and the outer surface 106S of the tines 106 for holding the retaining ring on the tines. In other aspects, the inner surface 701 of the retainer ring may include fastening members substantially similar to fastening members 105F and the outer surface 106S of the tines 106 may include fastening member substantially similar to fastening members 105M so that the retainer ring 700 may be threaded onto the tines 106. Any suitable retaining wire, pins, or snaps may be provided to substantially prevent the un-threading or backing off of the retaining ring 700 from the tines 106. As may be realized, the retaining ring 700 may substantially prevent the spreading of the tines further locking the engagement ramp 401 of each tine 106 against the engagement ramp 115S1 of the shoulder 115 (FIG. 6).

Disassembly of the tube fitting 105 may occur in a manner substantially opposite to that described above. However, the axial force needed to disengage the nut 101 from the union 100 may be substantially greater than the axial force needed to engage the nut 101 with the union 100. For example, as described above, the angle α of the disengagement ramps 401, 115S1 may be greater than the angle β so that the resistive force provided by the tines 106 in the axial direction is harder to overcome during disengagement than it is during engagement. In one aspect the angle α may be provided such that a predetermined torsional and/or axial disengagement force is applied to the nut 101 for moving the nut 101 in a disassembly direction 399B relative to the union 100 effecting a radial spreading of the distal ends of the tines 106 as the engagement ramp 401 of each tine 106 slides against the engagement ramp 115S1 of the shoulder 115. As may be realized, the predetermined torsional and/or axial disengagement force may be provided through the use of simple tools, such as with a wrench, applied to the one or more flats 113, 107. In other aspects the angle α may be such that movement of the nut 101 relative to the union 100 in the disengagement direction 399A may be provided substantially without tools. As may be realized, where the retainer ring 700 is provided the retainer ring is removed from the tines prior to disassembly of the tube fitting 105.

As can be seen from the above description, the tube fitting 105 in accordance with the aspects of the disclosed embodiment provides a metal on elastomeric material seal, a tube fitting that can be assembled by hand, a tube fitting that provides multiple sealing points and/or a tube fitting that includes a positive latching system that determines when a proper seal is made and substantially prevents the nut from disengaging the union 100. The configuration of the tube fitting 105 as described above allows for assembly of the tube fitting 105 so that the sealing of the tube fitting may be performed in less than about 10 seconds. In other aspects the sealing of the tube fitting may be performed in more or less than about 10 seconds. The torque and/or axial force for assembling the tube fitting 105 is low allowing for a tool-less installation of the tube fitting 105 while substantially eliminating a need to look up predetermined fitting torque values and preventing over tightening of the tube fitting. The elastomeric sealing members 103, 104 may compensate for fluctuation in the sealing surfaces of the union 100 and sleeve 102. The sealing surfaces of the tube fitting 105 can also be repaired by replacing one or more of the elastomeric members 103, 104.

In accordance with one or more aspects of the disclosed embodiment a tube fitting includes a first fitting member having a body including a shoulder portion; a second fitting member having a body including a gripping portion and a plurality of tines extending from the body, the plurality of tines being configured to engage the shoulder; and a third fitting member disposed between the first fitting member and second fitting member; and at least one elastomeric seal disposed between the first fitting member and the third fitting member.

In accordance with one or more aspects of the disclosed embodiment the first fitting member includes an internal passage formed through the body of the first fitting member; the second fitting member includes an internal passage formed through the body of the second fitting member; and the third fitting member includes a body having an internal passage and being configured to be at least partially inserted into a respective internal passage of each of the first and second fitting members.

In accordance with one or more aspects of the disclosed embodiment the body of the third fitting member includes a sealing surface; the internal passage of the first fitting member includes a mating sealing surface; and the at least one elastomeric seal includes a sealing member disposed between the sealing surface and the mating sealing surface. In accordance with one or more aspects of the disclosed embodiment the sealing surface of the third fitting member and the mating sealing surface are conical sealing surfaces and the at least one elastomeric seal includes a conical sealing member.

In accordance with one or more aspects of the disclosed embodiment the body of the third fitting member includes a flange portion having a sealing surface; the internal passage of the first fitting member includes a mating sealing surface; and the at least one elastomeric seal includes a sealing member disposed between the flange portion sealing surface and the mating sealing surface.

In accordance with one or more aspects of the disclosed embodiment the second fitting member is configured to engage the third fitting member and engagement between the first and second fitting members effects moving the third fitting member towards the first fitting member and compression of the at least one elastomeric seal.

In accordance with one or more aspects of the disclosed embodiment engagement of the plurality of tines with the shoulder is configured to produce one or more of a tactile, aural and visual indication that a predetermined compressive force is applied to the at least one elastomeric seal.

In accordance with one or more aspects of the disclosed embodiment the shoulder portion includes an angled engagement surface disposed at a first angle relative to an axis of the tube fitting and an angled disengagement surface disposed at a second angle relative to the axis, the first angle being different than the second angle; and each of the plurality of tines having a corresponding angled engagement surface and a corresponding angled disengagement surface; where the angled engagement surface and the corresponding angled engagement surface interface for assembly of the tube fitting and the angled disengagement surface and the corresponding angled disengagement surface interface to maintain a compressive force on the at least one elastomeric seal.

In accordance with one or more aspects of the disclosed embodiment the at least one elastomeric seal comprises a first and second elastomeric seal.

In accordance with one or more aspects of the disclosed embodiment each of the first and second elastomeric seal are configured to maintain at least partial system pressure within an internal passage of the tube fitting. In accordance with one or more aspects of the disclosed embodiment the second elastomeric seal is further configured to substantially prevent substance ingress to the first elastomeric seal.

In accordance with one or more aspects of the disclosed embodiment a hydraulic tubing joint includes first side and second side tubing members; a first fitting member coupled to the first side tubing member, the first fitting member having a body including a shoulder portion; a second fitting member having a body including a gripping portion and a plurality of tines extending from the body, the plurality of tines being configured to engage the shoulder; a third fitting member coupled to the second side tubing member, the third fitting member being disposed between the first fitting member and second fitting member; and at least one elastomeric seal disposed between the first fitting member and the third fitting member.

In accordance with one or more aspects of the disclosed embodiment the second fitting member includes an internal passage extending through the body of the second fitting member, where the second tubing member passes at least partially through the internal passage and the second fitting member is independently movable relative to at least the second tubing member and the third fitting member.

In accordance with one or more aspects of the disclosed embodiment the first fitting member includes an internal passage formed through the body of the first fitting member; the second fitting member includes an internal passage formed through the body of the second fitting member; and the third fitting member includes a body having an internal passage and being configured to be at least partially inserted into a respective internal passage of each of the first and second fitting members.

In accordance with one or more aspects of the disclosed embodiment the body of the third fitting member includes a sealing surface; the internal passage of the first fitting member includes a mating sealing surface; and the at least one elastomeric seal includes a sealing member disposed between the sealing surface and the mating sealing surface. In accordance with one or more aspects of the disclosed embodiment the sealing surface of the third fitting member and the mating sealing surface are conical sealing surfaces and the at least one elastomeric seal includes a conical sealing member.

In accordance with one or more aspects of the disclosed embodiment the body of the third fitting member includes a flange portion having a sealing surface; the internal passage of the first fitting member includes a mating sealing surface; and the at least one elastomeric seal includes a sealing member disposed between the flange portion sealing surface and the mating sealing surface.

In accordance with one or more aspects of the disclosed embodiment the second fitting member is configured to engage the third fitting member and engagement between the first and second fitting members effects moving the third fitting member towards the first fitting member and compression of the at least one elastomeric seal.

In accordance with one or more aspects of the disclosed embodiment engagement of the plurality of tines with the shoulder is configured to produce one or more of a tactile, aural and visual indication that a predetermined compressive force is applied to the at least one elastomeric seal.

In accordance with one or more aspects of the disclosed embodiment the shoulder portion includes an angled engagement surface disposed at a first angle relative to an axis of the tube fitting and an angled disengagement surface disposed at a second angle relative to the axis, the first angle being different than the second angle; and each of the plurality of tines having a corresponding angled engagement surface and a corresponding angled disengagement surface; where the angled engagement surface and the corresponding angled engagement surface interface for assembly of the tube fitting and the angled disengagement surface and the corresponding angled disengagement surface interface to maintain a compressive force on the at least one elastomeric seal.

In accordance with one or more aspects of the disclosed embodiment a method for connecting tubing is provided. The method includes aligning a first side tube fitting member with a second side tube fitting member; positioning at least one elastomeric seal member between the first and second side fitting members; moving the first side tube fitting member and the second side tube fitting member together to at least partially compress the at least one elastomeric seal member; engaging a third fitting member with the first side fitting member such that a seal formed by the at least one elastomeric seal member between the first side fitting member and the second side fitting is maintained through engagement between an angled surface of a tine portion of the third fitting member and an angled surface of a shoulder portion of the first side tube fitting.

In accordance with one or more aspects of the disclosed embodiment the method further includes providing, with at least the tine portion, one or more of a tactile, aural and visual indication that a predetermined compressive force is applied to the at least one elastomeric seal.

In accordance with one or more aspects of the disclosed embodiment engaging the third fitting member with the first side fitting member further compresses the at least one elastomeric seal member.

In accordance with one or more aspects of the disclosed embodiment a tube fitting includes a first coupling member having at least a snap coupling; and a second coupling member having a first quick-connect side having a mating snap coupling disposed at a first end of the second coupling member, and a second quick-connect side configured for threaded engagement disposed at a second end of the second coupling member, the second end being opposite the first end; wherein the mating snap coupling is configured to engage the snap coupling to effect coupling of the first and second coupling member.

In accordance with one or more aspects of the disclosed embodiment the first coupling member includes a threaded portion configured to engage the second quick-connect side of the second coupling member.

In accordance with one or more aspects of the disclosed embodiment the tube fitting further includes at least one elastomeric seal disposed between the first coupling member and the second coupling member.

In accordance with one or more aspects of the disclosed embodiment the at least one elastomeric seal comprises a first and second elastomeric seal, each of the first and second elastomeric seal are configured to maintain at least partial system pressure within an internal passage of the tube fitting.

In accordance with one or more aspects of the disclosed embodiment the second elastomeric seal is further configured to substantially prevent substance ingress to the first elastomeric seal.

In accordance with one or more aspects of the disclosed embodiment the tube fitting further includes a third coupling member disposed between the first coupling member and the second coupling member wherein the at least one elastomeric seal is disposed on the third coupling member and configured to interface with the first coupling member.

In accordance with one or more aspects of the disclosed embodiment the second coupling member is configured to engage the third coupling member and engagement between the first and second coupling members effects moving the third coupling member towards the first coupling member and compression of the at least one elastomeric seal.

In accordance with one or more aspects of the disclosed embodiment the mating snap coupling includes a plurality of tines extending from the second coupling member and the snap coupling includes a shoulder configured to mate with the plurality of tines.

In accordance with one or more aspects of the disclosed embodiment the snap coupling and the mating snap coupling each include corresponding engagement surfaces which are configured to produce one or more of a tactile, aural and visual indication that a predetermined compressive force is applied for sealing the tube fitting.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of the appended claims. Further, the mere fact that different features are recited in mutually different dependent or independent claims does not indicate that a combination of these features cannot be advantageously used, such a combination remaining within the scope of the aspects of the invention.

What is claimed is:

1. A tube fitting comprising:
a first coupling member having a snap coupling and a quick-connect threaded portion, the snap coupling including a first ramped engagement surface and a first ramped disengagement surface; and
a second coupling member having
a first quick-connect side having a mating snap coupling and being disposed at a first end of the second coupling member, the mating snap coupling having a second ramped engagement surface where an angle of the second ramped engagement surface is complimentary to an angle of the first ramped engagement surface, and a second ramped disengagement surface where an angle of the second ramped disengagement surface is complimentary to an angle of the first ramped disengagement surface, and a second quick-connect side configured for threaded engagement and being disposed at a second end of the second coupling member, the second end being opposite the first end;

wherein the quick-connect threaded portion comprises one of a quarter turn thread or a half turn thread being configured to engage the second quick-connect side of the second coupling member and the mating snap coupling is configured to engage the snap coupling to effect coupling of the first and second coupling member such that the first ramped disengagement surface and the second ramped disengagement surface are configured so that engagement of the first ramped disengagement surface with the second ramped disengagement surface provides a retention force that withstands fluidic system axial separation loads, applied to the first coupling member and the second coupling member, independent of the engagement between the quick-connect threaded portion and the second quick-connect side.

2. The tube fitting of claim 1, further comprises at least one elastomeric seal disposed between the first coupling member and the second coupling member.

3. The tube fitting of claim 2, wherein the at least one elastomeric seal comprises a first and second elastomeric seal, each of the first and second elastomeric seal are configured to maintain at least partial system pressure within an internal passage of the tube fitting.

4. The tube fitting of claim 3, wherein the second elastomeric seal is further configured to substantially prevent substance ingress to the first elastomeric seal.

5. The tube fitting of claim 2, further comprising a third coupling member disposed between the first coupling member and the second coupling member wherein the at least one elastomeric seal is disposed on the third coupling member and configured to interface with the first coupling member.

6. The tube fitting of claim 5, wherein the second coupling member is configured to engage the third coupling member and engagement between the first and second coupling members effects moving the third coupling member towards the first coupling member and compression of the at least one elastomeric seal.

7. The tube fitting of claim 1, wherein the mating snap coupling includes a plurality of tines extending from the second coupling member and the snap coupling includes a shoulder configured to mate with the plurality of tines.

8. The tube fitting of claim 1, wherein the first ramped engagement surface and the second ramped engagement surface of the snap coupling and the mating snap coupling are configured to produce one or more of a tactile, aural and visual indication that a predetermined compressive force is applied for sealing the tube fitting.

9. The tube fitting of claim 1, wherein the angle of the second ramped engagement surface is substantially the same as the angle of the first ramped engagement surface, and the angle of the second ramped disengagement surface is substantially the same as the angle of the first ramped disengagement surface.

10. A tube fitting comprising:

a first fitting member having a body including a shoulder portion and a first quick-connect threaded portion, the shoulder portion includes an angled engagement surface disposed at a first angle relative to an axis of the tube fitting and an angled disengagement surface disposed at a second angle relative to the axis, the first angle being different than the second angle;

a second fitting member having a body including a gripping portion, a second quick-connect threaded portion and a plurality of tines extending from the body, the plurality of tines being configured to engage the shoulder and the first quick-connect threaded portion being configured to engage the second quick-connect threaded portion, each of the plurality of tines having a complimentary angled engagement surface and a complimentary angled disengagement surface, where the angled engagement surface and each corresponding complimentary angled engagement surface interface for assembly of the tube fitting and the angled disengagement surface and each corresponding complimentary angled disengagement surface are configured to interface such that a retention force that withstands fluidic system axial separation loads, applied to the first fitting member and the second fitting member, is applied by the interface between the angled disengagement surface and each corresponding complimentary angled disengagement surface independent of engagement between the first quick-connect threaded portion and the second quick-connect threaded portion, where each of the first quick-connect threaded portion and the second quick-connect threaded portion comprise one of complimentary quarter turn threads or complimentary half turn threads;

a third fitting member disposed between the first fitting member and second fitting member; and at least one elastomeric seal disposed between the first fitting member and the third fitting member.

11. The tube fitting of claim 10, wherein the first fitting member includes an internal passage formed through the body of the first fitting member;

the second fitting member includes an internal passage formed through the body of the second fitting member; and the third fitting member includes a body having an internal passage and being configured to be at least partially inserted into a respective internal passage of each of the first and second fitting members.

12. The tube fitting of claim 11, wherein the body of the third fitting member includes a sealing surface;

the internal passage of the first fitting member includes a mating sealing surface; and the at least one elastomeric seal includes a sealing member disposed between the sealing surface and the mating sealing surface.

13. The tube fitting of claim 12, the sealing surface of the third fitting member and the mating sealing surface are conical sealing surfaces and the at least one elastomeric seal includes a conical sealing member.

14. The tube fitting of claim 11, wherein the body of the third fitting member includes a flange portion having a sealing surface;

the internal passage of the first fitting member includes a mating sealing surface; and the at least one elastomeric seal includes a sealing member disposed between the flange portion sealing surface and the mating sealing surface.

15. The tube fitting of claim 10, wherein the second fitting member is configured to engage the third fitting member and engagement between the first and second fitting members effects moving the third fitting member towards the first fitting member and compression of the at least one elastomeric seal.

16. The tube fitting of claim 10, wherein engagement of the plurality of tines with the shoulder is configured to produce one or more of a tactile, aural and visual indication that a predetermined compressive force is applied to the at least one elastomeric seal.

17. The tube fitting of claim 10, wherein the angled disengagement surface and the corresponding angled disengagement surface interface to maintain a compressive force on the at least one elastomeric seal.

18. The tube fitting of claim 10, wherein the at least one elastomeric seal comprises a first and second elastomeric seal.

19. The tube fitting of claim 18, wherein each of the first and second elastomeric seal are configured to maintain at least partial system pressure within an internal passage of the tube fitting.

20. The tube fitting of claim 19, wherein the second elastomeric seal is further configured to substantially prevent substance ingress to the first elastomeric seal.

* * * * *